United States Patent [19]
Rub et al.

[11] Patent Number: 5,490,442
[45] Date of Patent: Feb. 13, 1996

[54] SAFETY CIRCUIT FOR A SERVO-HYDRAULIC REGULATING SYSTEM

[75] Inventors: Winfried Rub, Neustadt/Main; Rainer Biener, Steinfeld-Hausen, both of Germany

[73] Assignee: Mannesmann Rexroth GmbH, Germany

[21] Appl. No.: 120,209

[22] Filed: Sep. 13, 1993

[30] Foreign Application Priority Data

Sep. 17, 1992 [DE] Germany .......................... 42 31 189.6

[51] Int. Cl.$^6$ .............................. F15B 11/08; F16D 31/02
[52] U.S. Cl. .................. 91/445; 91/446; 91/448; 60/406
[58] Field of Search ................ 91/432, 444, 445, 91/446, 448; 60/403, 406

[56] References Cited

U.S. PATENT DOCUMENTS

| | | | |
|---|---|---|---|
| 4,111,283 | 5/1978 | Hastings | 91/445 X |
| 4,391,183 | 7/1983 | Broms et al. | 91/445 X |
| 4,510,847 | 4/1985 | Mucheyer et al. | |
| 4,667,570 | 5/1987 | Jensen | 91/446 X |
| 4,677,899 | 7/1987 | Schulte et al. | |
| 4,713,936 | 12/1987 | Barber et al. | 60/403 |
| 4,838,306 | 6/1989 | Horn et al. | 91/445 X |
| 4,936,032 | 6/1990 | Marcon | |

FOREIGN PATENT DOCUMENTS

| | | | |
|---|---|---|---|
| 2818864 | 11/1978 | Germany | 91/445 |
| 2940403 | 4/1981 | Germany . | |
| 3106086 | 9/1982 | Germany . | |
| 3239952 | 10/1982 | Germany . | |
| 3133651 | 3/1983 | Germany . | |
| 3146130 | 6/1983 | Germany . | |
| 3343234 | 6/1985 | Germany . | |
| 3506335 | 8/1986 | Germany . | |
| 3613689 | 12/1988 | Germany . | |
| 3621854 | 8/1990 | Germany . | |
| 3227050 | 10/1990 | Germany . | |
| 2255840 | 11/1992 | United Kingdom | 60/406 |
| 2278694 | 12/1994 | United Kingdom . | |
| WO91019108 | 12/1991 | WIPO . | |

Primary Examiner—Thomas E. Denion
Assistant Examiner—Hoang Nguyen
Attorney, Agent, or Firm—Cushman Darby & Cushman

[57] ABSTRACT

A safety circuit for a servo-hydraulic regulating system for the hydraulic control and actuation of load units, such as operating tools on utility vehicles and agricultural machines. The controlling of the load unit is effected via a proportional valve which is actuated in dependence upon a pair of output signals of a measuring bridge in such a way that, in the event of a balanced measuring bridge, it assumes a neutral setting in which the operating line running to the load unit or emanating from the load unit is blocked. In order to prevent the lifting gear from executing a regulating reaction if the measuring bridge is out of tune when the servo-hydraulic regulating system is switched on, a safety valve arrangement is provided in the operating line. Depending on at least one control signal determined by the setting of the proportional valve, when the regulating system is switched on, the operating line is blocked until, via the at least one control signal, the balance of the measuring bridge has been registered.

30 Claims, 2 Drawing Sheets

5,490,442

SAFETY CIRCUIT FOR A SERVO-HYDRAULIC REGULATING SYSTEM

BACKGROUND OF THE INVENTION

1. Field of the Invention

The invention relates to a safety circuit for a servo-hydraulic regulating system for the hydraulic control and actuation of a load unit, in particular of operating tools on utility vehicles and agricultural machines.

2. Background of the Invention

Servo-hydraulic regulating systems are needed, in particular, in mobile hydraulics, where it is important to provide the user of an operating tool with a maximum of operating or accident safety. More particularly, vibrations arising from bumps during the usage of utility vehicles and agricultural machinery can be transmitted to their operating tools. Because of their large mass, typical operating tools can thus exert a considerable influence upon the pitching vibrations of the vehicle. Accordingly, servo-hydraulic regulating systems are required which essentially serve as a guide mechanism of the operating tool for maintaining a pre-set position relative to the vehicle and as a facility for compensating for lifting and pitching vibrations of the vehicle.

The safety requirements placed upon machinery and tools of the above-described type have recently become increasingly strict. In the field of servo-hydraulic regulating systems, such as servo-hydraulic lifting gear regulating systems on tractors (SHL-systems), the safety functions are inferior, in part-areas, to those of electro-hydraulic systems. Accordingly, the absence of certain safety functions is a distinguishing feature between servo-hydraulic and electro-hydraulic systems.

Servo-hydraulic lifting gear regulating systems, such as those shown in German Offenlegungsschrift 2940403 or German Offenlegungsschrift 3106086, operate with a main valve, in the form of a directional control valve or proportional valve, which is pressure-actuated in two directions and which is controlled by a control circuit having a hydraulic measuring bridge with fixed and variable restrictors. One of the variable restrictors serves as a set-value generator and the other as a regulating variable sensor which is mechanically coupled to the moved part of the lifting gear. When, via a variable restrictor, a new set value for the lifting gear has been set, the directional control or proportional valve is displaced from the neutral setting and only reverts to there once the hydraulic measuring bridge is balanced, i.e., once the control pressures bearing against the proportional valve piston are equalized.

In previous servo-hydraulic lifting gear regulating systems, if the regulating system is switched on, i.e., the motor is started, when the measuring bridge is out of tune, a sudden and unexpected regulating reaction will give rise to a dangerous lifting gear movement. In that regard, the measuring bridge can become unbalanced while the motor is idle as a result of one or more measuring orifices falling out of tune, i.e., for example, as a result of lever shift, change of force at the force sensor, or change of location of the lifting gear.

SUMMARY OF THE INVENTION

It is therefore an object of the invention to provide a safety circuit for a servo-hydraulic regulating system of the type described in German Offenlegungsschrift 2940403 or German Offenlegungsschrift 3106086, but wherein the above-noted safety problem is reliably solved. The solution is to be distinguished here by the fact that the serial testing of the safety function can be documented at the tool itself.

The foregoing object is achieved by providing a safety circuit for a servo-hydraulic regulating system for the hydraulic control and actuation of a load unit in which the controlling of the load unit is effected via a proportional valve which is controlled, in turn, by a pair of output signals of a measuring bridge in such a way that, in the event of a balanced measuring bridge, it assumes a neutral setting in which the operating line running to the load unit or emanating from the load unit is blocked, and wherein a safety valve arrangement is provided in the operating line. In dependence on at least one control signal determined by the setting of the proportional valve, when the regulating system (SHL) switched on, the safety valve blocks the operating line until such time as, via the at least one control signal, the balance of the measuring bridge has been registered.

According to the invention, every effort is made to ensure that the hydraulic safety circuit switches into or stays in the neutral state or shuts off the valve output to the load unit until such time as it has been established that the proportional valve is in the neutral setting. It is thereby ensured that if the measuring bridge, upon being switched off or in the switched-off state or upon being switched on, should be out of tune, then no uncontrolled or non-anticipated lifting gear movement takes place. According to the invention, signal outputs of the servo-hydraulic regulating system are themselves used to identify the neutral setting. The safety valve can only pass into the open, i.e., through-connect, setting, if the proportional valve of the servo-hydraulic regulating system is in the neutral setting. Because the control pressures for the safety valve are thus generated directly and unambiguously by the setting of the regulating piston at the proportional valve, the safety function is integrated directly into the regulating unit. Apart from the fact that there is thus no need for a further control line additional to an external set-value generator, the specific advantage is hereby obtained that the entire safety function is assigned to the main valve. The serial testing of the safety function can thus even be carried out at the tool itself.

Via the proportional valve there is regularly run, in addition to the main operating line, an auxiliary or pilot pressure line. The pressure in the pilot pressure line downstream of the proportional valve and a pressure derived from the pressure in the operating pressure line downstream of the proportional valve, bear against a changeover valve, via which one of those two pressures upon the directional control valve is obtained.

In accordance with a further feature of the invention, the pressure noted above which is derived from the pressure in the operating line downstream of the proportional valve constitutes the pressure in a branch line, which branches off from the operating line. The branch line is capable of being relieved of load in the direction of the tank (T) via the proportional valve, in the neutral setting (N) of the latter, and being connected to the output of the flow-regulating valve, the intake of which is connected to the operating line upstream of the proportional valve. As a result, the pressure signal which is derived from the pressure in the operating line downstream of the proportional valve is generated at a relatively low energy cost. As long as the proportional valve is in the neutral setting, the flow-regulating valve ensures that only a slight residual pressure of, for example, 5 bar is maintained downstream of the pump. If, however, the main valve piston is displaced into the raise setting, a pressure feedback is relayed, by means of the orifice, to the flow-regulating valve, so that a higher pressure signal, corresponding to the load, is then built up for the control of the safety valve arrangement.

The safety circuit according to the invention can be constructed in a plurality of concrete designs of the main valve piston, provided that the guiding edges of the proportional valve are configured such that, in the neutral setting (N), both control signals are zero, in a lower setting (S) the pressure in the pilot pressure line downstream of the proportional valve is greater than a reference pressure (P*) and in a raise setting (H) the pressure derived from the pressure in the operating pressure line downstream of the proportional valve is greater than the reference pressure.

In accordance with further features of the invention, particularly high switching forces are obtainable at the safety valve. More particularly, in accordance with a preferred embodiment of the invention, the force of a pretensioning spring is essentially half as great as the compressive force of the reference pressure (P*) which acts upon the directional control valve and/or the reference pressure (P*) is throttled to a value corresponding to around 50% of the pilot pressure upstream of the proportional valve.

The releasable check valve can be disposed either upstream or downstream of the directional control valve, so that the safety circuit according to the invention can be incorporated, with little switch-circuit complexity, even into existing systems.

BRIEF DESCRIPTION OF THE DRAWINGS

Two illustrative embodiments of the invention are explained in greater detail below with reference to schematic drawings, in which.

DETAILED DESCRIPTION OF THE INVENTION

Figure 1:
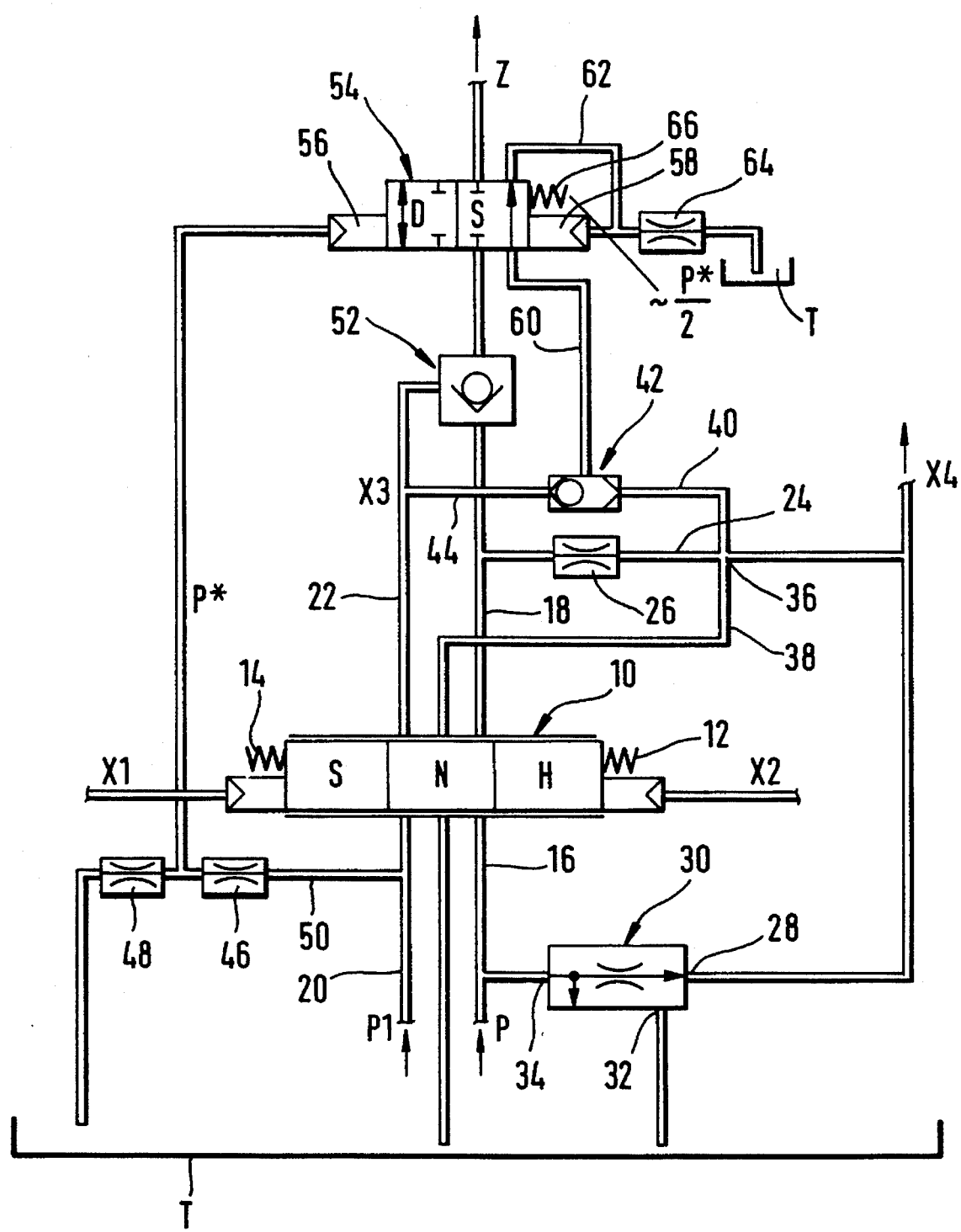
FIG. 1 shows a circuit diagram of the hydraulic safety circuit according to a first embodiment.

In FIG. 1, a proportional valve is denoted by the reference symbol 10, which proportional valve serves as the main valve of a servo-hydraulic regulating system for the hydraulic control and actuation of a load unit Z. The load unit Z is formed, for example, by an operating tool on utility vehicles and agricultural machines, such as by the working cylinder of the lifting gear of a farming tractor. The proportional valve 10 has three principal settings, namely an N (neutral) setting, an H (raise) setting and an S (lower) setting. The valve piston of the proportional valve 10 is centered in the N setting by means of two springs 12, 14. Furthermore, the valve piston is acted upon in opposite directions by the pilot pressures $X_1$ and $X_2$, which constitute the output signals of a measuring bridge (not represented in greater detail) for the location of the lifting gear or load unit. In the case of a balanced measuring bridge, the signals $X_1$ and $X_2$ are precisely of such a size that their dynamic effects upon the main valve piston of the proportional valve 10 are counterbalanced. Otherwise, i.e., in the event of the measuring bridge becoming unbalanced, as a result of one or more measuring orifices becoming detuned (i.e., as a result of lever shift, change of force at a force sensor, change of lifting gear location), the valve piston of the proportional valve 10 is deflected until such time as the set value at the load unit is reached and the measuring bridge has returned to balance.

To prevent a sudden and unexpected regulating reaction from occurring at the lifting gear the servo-hydraulic regulating system is switched on as a result of an unintentional detuning of the measuring bridge while the motor is idle or during the switch-on phase, a safety valve arrangement in accordance with the present invention is provided. More particularly, in accordance with the invention, an operating line 16, 18 is run via the proportional valve 10 and supplied by a main pump and an auxiliary or pilot pressure line 20, 22. The line sections downstream of the proportional valve 10 are denoted by 18 and 22. Branching off from the line section 18 of the operating line, downstream of the servo valve 10, is a line 24, in which an orifice 26 is located by means of which, outside the N setting of the proportional valve 10, a pressure feedback is relayed to the output side 28 of a 3-way flow-regulating valve 30. The flow-regulating valve 30 has a connection 32 to the tank T and an intake 34, which is connected to the operating line 16 upstream of the proportional valve 10. The regulating piston of the 3-way flow-regulating valve 30 ensures that the pump output which is not required is fed, via a separate guiding edge, directly to the tank, so that the pump only has to operate against the respective load pressure plus the pressure differential at the flow-regulating valve. In the line 24, a branching point is denoted by 36, from which a line section 38 is run back to the proportional valve 10, the guiding edges of which, in the neutral setting N, relieve the pressure in the direction of the tank T. Departing from the branching point 36 on the other side if a control line 40, which is run to a changeover valve 42. At the branching point 36 there is thus, in the N setting of the proportional valve 10, a pressure $X_4$ which is close to zero, whereas, when the main valve piston is displaced from the N setting into the H setting, a pressure $X_4$ is present, which reflects the load pressure in the operating line 18 downstream of the servo valve 10.

The second connection of the changeover valve 42 is connected via a control line section 44 to the line 22, which is supplied by the pilot pressure $P_1$ and in which the pressure signal $X_3$ is dominant. From the pilot pressure $P_1$ there is derived, moreover, a reference pressure P*, which is read off between two restrictors 46, 48 in a branch line 50. The auxiliary pressure is set, for example, to a pressure valve between 17 and 20 bar and the reference pressure P* is set, by suitable selection of the restrictor values, to around 50% of the value $P_1$.

Into the operating line 18 running to the load unit Z there are connected, in series, a releasable check valve 52 and a safety-directional control valve 54, the latter of which is configured as a 4/2-way valve and the control elements of which are denoted by 56 and 58. The safety-directional control valve 54 has two switch settings, namely a shut-off setting S and a through-connect setting D in which the operating line 18 is through-connected to the load unit Z. In the shut-off setting S, the operating line 16 is interrupted and the connection between an output line 60 of the changeover valve 42 and the control element 58 is created via the line section 62. The control element 58 can be relieved of load in the direction of the tank T via a restrictor 64. Acting in the same direction as the pressure in the control element 58 is a return spring 66. The pressure in the control element 56 corresponds to the reference pressure P*. The force of the spring 66 is preferably set such that it essentially corresponds to half the compressive force of the reference pressure P* at the directional control valve 54.

The guiding edges of the proportional valve 10 are not represented in detail in FIG. 1. A detailed description can be omitted on the grounds that these particulars are not important to the functioning of the safety circuit. All that is critical is that it is ensured, by suitable matching of the components, that the following conditions are to be met:

S setting: $X_3 > P^*$

N setting: $X_3 = 0$
$X_4 = 0$

H setting: $X_4 > P^*$

With the above construction of the safety circuit, the following working method is obtained:

in the switched-off state of the servo-hydraulic regulating system, the valves assure the settings shown in FIG. 1. If, during the switched-off state of the servo-hydraulic regulating system, the measuring bridge has not shifted, the pressure signals $X_3$ and $X_4$ remain at zero and, due to the gradual build-up of pilot pressure $P_1$, a sufficiently high reference pressure $P^*$ also builds up, thereby causing the directional control valve 54 to be displaced from the switch setting S into the switch setting D. The line sections 62 and 60 are separated via the valve piston, whereas the operating line 16 is through-connected. A movement at the load unit, such as at the lifting gear, does not occur, since the proportional valve 10 is in the neutral setting N. The servo-hydraulic regulating system subsequently operates conventionally, since the pressure signals $X_3$ and $X_4$ which vary with the displacement of the main valve piston are prevented, by the shutting-off of line sections 60 and 62, from having an effect upon the control element 58. The directional control valve 54 remains in the through-connect setting D until such time as, upon the operating tool being switched off, the pilot pressure $P_1$ and hence also the reference pressure $P^*$ has fallen far enough to enable the return spring 66 to surmount the compression force at the control element 56.

In the event, however, of a detuning of the measuring bridge either before or upon switching on the regulating system, the following applies:

the detuning of the measuring bridge results in the valve piston of the proportional valve 10 being displaced into the S setting or into the H setting. A pressure signal $X_3$ or $X_4$ can thereby build up in the line 22 or in the control line 40, which pressure signal is in any event greater than the reference pressure signal $P^*$. The pressure signal $X_3$ or $X_4$ is conducted via the changeover valve 42, the line 60, the directional control valve 54 and via the line section 62 to the control element 58, so that the valve piston of the directional control valve 54 remains in the shut-off setting S, even if the reference pressure $P^*$ is present. The shut-off setting of the directional control valve 54 ensures at this moment that the lifting gear also fails to move when the piston of the proportional valve 10 is in the S setting and accordingly, at the shut-off block 52, a signal pressure $X_3$ is present which is sufficiently high to release the check valve. The safety valve 54 can only pass into the open setting, i.e., into the through-connect setting D, if the proportional valve has re-assumed the neutral setting N. The pressure signals $X_3$ and $X_4$ then return to zero and the pressure in the control element 58 can be reduced via the restrictor 64, so that, by means of the reference pressure $P^*$ acting upon the control element 56, the valve piston can be displaced, against the force of the return spring 66, into the switch setting D. The open switch setting D is maintained until such time as the auxiliary or pilot pressure $P_1$ and hence the reference pressure $P^*$, upon the motor being switched off, falls to a predetermined value of, for example, $P_1$ <10 bar. This safety function can also be fulfilled during the switch-on phase of the servo-hydraulic regulating system, i.e., even at pilot pressure $P_1$ over 10 bar, since it is possible to ensure, by an appropriate choice of the restrictor 46 and 48 in accordance with the force of the return spring 66 and of the cross-sectional area of the control element 58, that, when the main valve piston is displaced from the neutral setting N, the build-up on the spring side of the safety valve takes place sufficiently rapidly to prevent a displacement of the valve piston from the shut-off setting S into the through-connect setting D.

The signal outputs $X_3$ and $X_4$ of the servo-hydraulic regulating system are thus used to identify the neutral setting N of the proportional valve 10; only when, following a switch-on, the neutral setting N has been established via the signals $X_3$ and $X_4$, can the safety valve then be brought into a setting which frees the supply to the load unit. Otherwise, the load unit is shut off until such time as a balance of the measuring bridge has been registered. Since the control pressures $X_3$, and $X_4$ for the safety valve 54 are generated directly and unambiguously the setting of the regulating piston at the proportional valve 10, the function-checking of the safety circuit can be carried out directly at the individual tool. Because the safety function is integrated directly into the regulating unit, there is no need either for a further control line additional to an external set-value generator. The entire safety function is thus assigned to the main valve 10, thereby bringing the safety level of the servo-hydraulic system up to that electro-hydraulic systems.

A feature of the above-described safety circuit consists in the fact that the safety-directional control valve 54, once the measuring bridge is balanced, is held in the setting D. The reference pressure $P^*$ generates in any event, via the control element 56, a substantially greater controlling force upon the piston of the directional control valve 54 than that which is able to be applied by the return spring 66.

Figure 2:
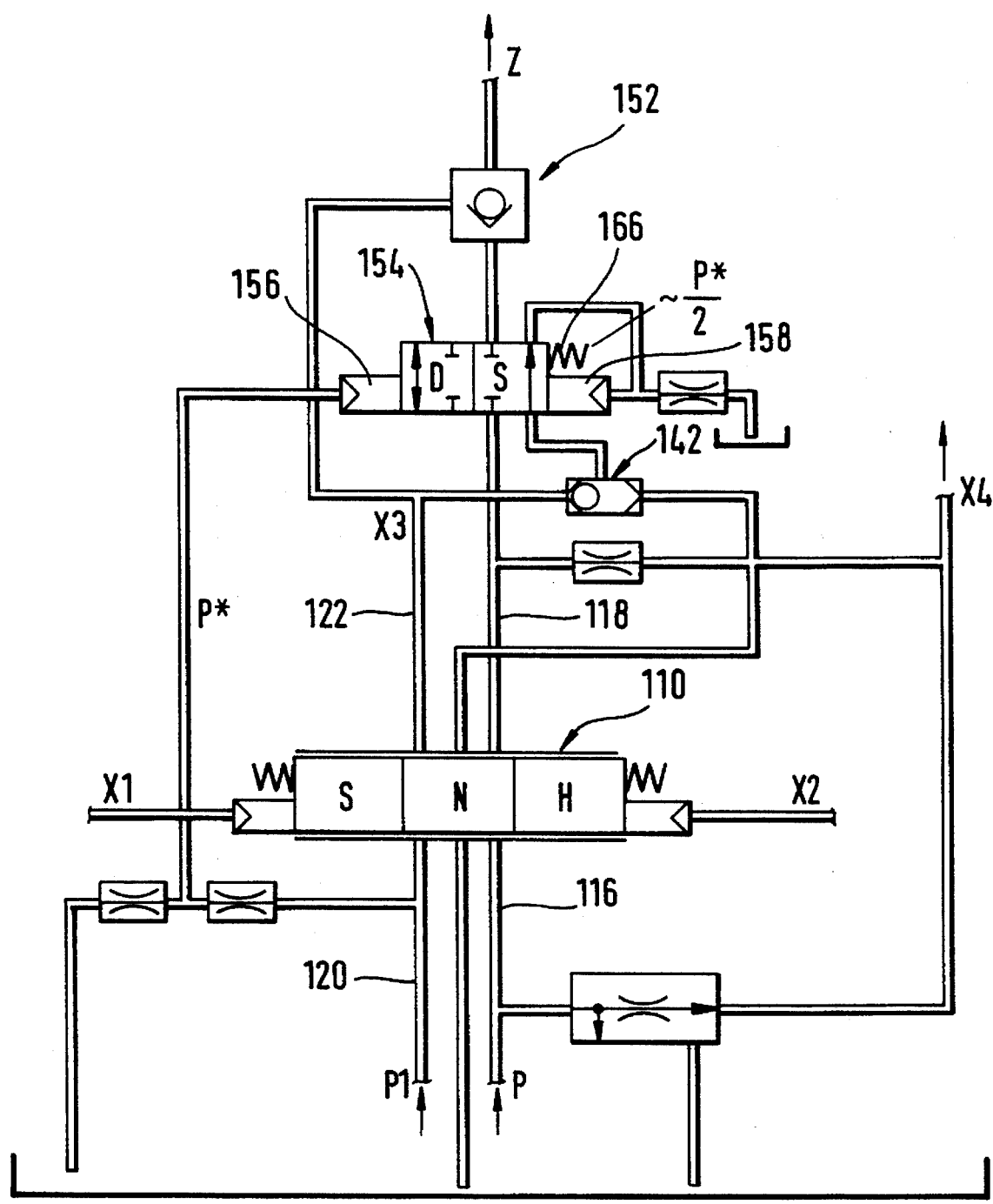
FIG. 2 shows a circuit diagram of the hydraulic safety circuit according to a second embodiment.

The embodiment according to FIG. 2 differs from that according to FIG. 1 only in the fact that the releasable check valve, i.e, the shut-of block in the operating line 118, is disposed downstream of the safety-directional control valve 154. It can be readily seen that in this case also, in the event of the measuring bridge becoming detuned in the switch-on phase of the servo-hydraulic regulating system, if, in the lowering setting S of the main valve 10, a pressure signal $X_3$ were to be present which were sufficiently high for the release of the shut-off block 152, then any movement of the load unit Z is in any event precluded until such time as a balance of the measuring bridge has been registered. For the signal $X_3$ is conducted via the changeover valve 142 to the adjusting element 158, so that the valve piston of the safety-directional control valve 154 is held in the shut-off setting S. Only once the main valve is back in the neutral setting N is the signal pressure $X_3$ reduced to zero, so that the reference pressure $P^*$ is able, via the control element 156, to displace the directional control valve into the through-connect setting D.

Deviations from the above-described illustrative embodiments are of course possible without departing from the basic concept of the invention. The safety circuit is thus also of course applicable to dual-acting load units, in which case it can be beneficial to provide a separate safety valve for each load unit line. With the invention, the safety level of the servo-hydraulic regulating system is considerably raised and an additional advantage is obtained in terms of quality assurance, since the documentation of the reliability checking can now be carried out directly at the individual tool. The invention is equally applicable to regulating devices in which the control signals $X_1$ and $X_2$ of the measuring bridge are formed by electrical signals.

The invention thus provides a safety circuit for a servo-hydraulic regulating system for the hydraulic control and actuation of a load unit, in particular of operating tools on utility vehicles and agricultural machines. The controlling of the load unit is effected via a proportional valve which is actuated in dependence on a pair of output signals of a measuring bridge in such a way that, in the event of a balanced measuring bridge, it assumes a neutral setting in which the operating line running to the load unit or emanating from the load unit is blocked. In order in any event to prevent the lifting gear from executing a regulating reaction in the event of the servo-hydraulic regulating system being switched on and the measuring bridge being out of tune, there is provided in the operating line a safety valve arrangement by which, in dependence on at least one control signal determined by the setting of the proportional valve, upon the regulating system being switched on, a blocking of the operating line is ensured until such time as, via the at lease one control signal, the balance of the measuring bridge has been registered.

What is claimed is:

1. A servo-hydraulic regulating system for controlling and actuating a load unit, the system comprising:

an operating line connecting a pressure fluid supply and the load unit;

a proportional valve incorporated into said operating line for controlling the load unit, said proportional valve being controlled by a measuring bridge which generates output pressure signals which control a position of said proportional valve, said proportional valve having a neutral setting in which said operating line is blocked, wherein said proportional valve assumes said neutral setting when said measuring bridge is balanced; and a safety circuit comprising a safety valve arrangement incorporated into said operating line, wherein said safety valve arrangement includes a directional control valve in said operating line, said directional control valve having a first valve position which opens said operating line, and a second valve position which blocks said operating line, wherein, in a power-up condition of the system, said safety valve arrangement blocks said operating line until said measuring bridge is balanced.

2. A servo-hydraulic regulating system according to claim 1, wherein said directional control valve has a piston provided therein which moves between said first and second valve positions under the influence of a first pressure and a second pressure applied via a first end of the directional control valve.

3. A servo-hydraulic regulating system according to claim 2, wherein the pressure acting on said directional control valve, which is dependent upon the setting of said proportional valve, is read off from said operating line downstream from said proportional valve.

4. A servo-hydraulic regulating system according to claim 1, further comprising a changeover valve and a pilot pressure line connected to said proportional valve, wherein said changeover valve selectively communicates a first pressure in said pilot pressure line downstream of said proportional valve and a second pressure in said operating line downstream of said proportional valve to said directional control valve.

5. A servo-hydraulic regulating system according to claim 4, further comprising a check valve provided in said pilot pressure line, wherein a pressure in said pilot pressure line downstream of said proportional valve actuates said check valve.

6. A servo-hydraulic regulating system according to claim 1, wherein a reference pressure corresponds to a pressure in said pilot pressure line on an upstream side of said proportional value.

7. A servo-hydraulic regulating system according to claim 4, further comprising:

a branch line branching from said operating line downstream of said proportional valve, wherein a pressure in said branch line is derived from the pressure in the operating line downstream of said proportional valve said branch line being able to be relieved of load in the direction of said pressure fluid supply via said proportional valve in neutral setting of said proportional valve; and a flow-regulating valve provided in said branch line.

8. A servo-hydraulic regulating system according to claim 6 or claim 7, wherein the load unit can be raised or lowered, wherein said proportional valve has multiple settings, wherein:

in the neutral setting of said proportional valve, a pressure in said operating line downstream from said proportional valve and a pressure in said pilot pressure line downstream from said proportional valve are both substantially zero, in a setting of said proportional valve for lowering the load unit, said pressure in said pilot pressure line downstream from said proportional valve is greater than said reference pressure, in a setting of said proportional valve to raise the load unit, said pressure in said operating pressure line downstream of said proportional valve is greater than said reference pressure.

9. A servo-hydraulic regulating system according to claim 6, wherein said safety control valve includes a spring member for urging said valve towards said second valve position, wherein a force of said spring member is half of a force due to said reference pressure acting upon said directional control valve.

10. A servo-hydraulic regulating system according to claim 6, wherein said reference pressure is throttled to to about 50% of the a pressure in said pilot pressure line upstream of said proportional valve.

11. A servo-hydraulic regulating system according to claim 1, wherein the output signals of the measuring bridge are formed by pilot-pressure signals.

12. A safety circuit in a servo-hydraulic regulating system for the hydraulic control and actuation of a load unit, the servo-hydraulic regulating system having an operating line communicating with a pressure fluid supply, a proportional valve for controlling the load unit and having a neutral setting which blocks the operating line, and a measuring bridge which generates output pressure signals for controlling setting of the proportional valve;

the safety circuit comprising:

a safety valve arrangement provided in the operating line, said safety circuit valve arrangement blocking the operating line when the measuring bridge is not balanced, said safety valve arrangement including a directional control valve incorporated into the operating line, said directional control valve including a directional control valve piston, wherein a first position of said directional control valve piston opens the operating line and a second position of said directional control valve piston closes the operating line, wherein, in a power-up of the servo-hydraulic regulating system, said directional control valve is adapted to close the operating line until the measuring bridge is balanced.

13. A safety circuit according to claim 12, wherein a pressure acting on said directional control valve, which is dependent on a setting of the proportional valve, is conducted via a guiding edge to an adjusting side of said directional control valve piston.

14. A safety circuit according to claim 12 or 13, wherein the pressure acting on said directional control valve piston, which is dependent upon a setting of the proportional valve, is read off from the operating line downstream from said proportional valve.

15. A safety circuit according to claim 12, further comprising a pilot pressure line connected to the proportional valve, and a changeover valve, wherein said changeover valve selectively communicates a first changeover valve pressure in said pilot pressure line downstream of the proportional valve and a second changeover valve pressure in the operating line downstream of the proportional valve to said directional control valve.

16. A safety circuit according to claim 15, further Comprising a check valve provided in said pilot pressure line, wherein a pressure in said pilot pressure line downstream of the proportional valve actuates said check valve.

17. A safety circuit according to claim 12, wherein a reference pressure corresponds to a pressure in said pilot pressure line on an upstream side of the proportional valve.

18. A safety circuit according to claim 13, wherein a reference pressure corresponds to a pressure in said pilot pressure line on an upstream side of the proportional valve.

19. A safety circuit according to claim 14, wherein a reference pressure corresponds to a pressure in said pilot pressure line on an upstream side of the proportional valve.

20. A safety circuit according to claim 15, wherein a reference pressure corresponds to a pressure in said pilot pressure line on an upstream side of the proportional valve.

21. A safety circuit according to claim 16, wherein a reference pressure corresponds to a pressure in said pilot pressure line on an upstream side of the proportional valve.

22. A safety circuit according to claim 15, further comprising:

a branch line branching from the operating line downstream of the proportional valve, wherein a pressure in said branch line is derived from the pressure in the operating line downstream of the proportional valve, said branch line being able to be relieved of load in the direction of a pressure fluid supply via the proportional valve in a neutral setting of the proportional valve; and a flow-regulating valve provided in said branch line.

23. A safety circuit according to claim 16, further comprising:

a branch line branching from the operating line downstream of the proportional valve, wherein a pressure in said branch line is derived from the pressure in the operating line downstream of the proportional valve said branch line being able to be relieved of load in the direction of a pressure fluid supply via the proportional valve in a neutral setting of the proportional valve; and a flow-regulating valve provided in said branch line.

24. A safety circuit according to claim 17, further comprising:

a branch line branching from the operating line downstream of the proportional valve, wherein a pressure in said branch line is derived from the pressure in the operating line downstream of the proportional valve said branch line being able to be relieved of load in the direction of a pressure fluid supply via the proportional valve in a neutral setting of the proportional valve; and a flow-regulating valve provided in said branch line.

25. A safety circuit according to claim 17, wherein the load unit can be lifted or lowered, wherein the proportional valve has multiple settings, wherein:

in a neutral setting of the proportional valve, a pressure in the operating line downstream from the proportional valve and a pressure in said pilot pressure line downstream from the proportional valve are both substantially zero, in a setting of the proportional valve for lowering the load unit, said pressure in said pilot pressure line downstream from the proportional valve is greater than said reference pressure, and in a setting of the proportional valve for raising the load unit, said pressure in the operating line downstream of the proportional valve is greater than said reference pressure.

26. A safety circuit according to claim 22, wherein the load unit can be lifted or lowered, wherein the proportional valve has multiple settings, wherein:

in a neutral setting of the proportional valve, a pressure in the operating line downstream from the proportional valve and a pressure in said pilot pressure line downstream from the proportional valve are both substantially zero, in a setting of the proportional valve for lowering the load unit, said pressure in said pilot pressure line downstream from the proportional valve is greater than said reference pressure, and in a setting of the proportional valve for raising the load unit, said pressure in the operating pressure line downstream of proportional valve is greater than said reference pressure.

27. A safety circuit according to claim 12, wherein said directional control valve includes a spring member for urging said direction control valve piston towards said second position thereof, a force of said spring member being about half of a force applied by a reference pressure on said directional control valve.

28. A safety circuit according to claim 17, wherein said reference pressure is throttled to about 50% of a pressure in said pilot pressure line upstream of the proportional valve.

29. A safety circuit according to claim 16, wherein said directional control valve is disposed upstream of said check valve.

30. A safety circuit according to claim 16, wherein said directional control valve is disposed downstream of said check valve.

* * * * *